(12) United States Patent
Yoon

(10) Patent No.: US 11,955,606 B2
(45) Date of Patent: Apr. 9, 2024

(54) WIRELESS COMMUNICATION METHOD IN BATTERY PACK AND MASTER BMS PROVIDING THE METHOD

(71) Applicant: LG ENERGY SOLUTION, LTD., Seoul (KR)

(72) Inventor: Ho Byung Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/928,495

(22) PCT Filed: Aug. 10, 2021

(86) PCT No.: PCT/KR2021/010597
§ 371 (c)(1),
(2) Date: Nov. 29, 2022

(87) PCT Pub. No.: WO2022/059922
PCT Pub. Date: Mar. 24, 2022

(65) Prior Publication Data
US 2023/0207890 A1    Jun. 29, 2023

(30) Foreign Application Priority Data

Sep. 21, 2020 (KR) .................. 10-2020-0121337

(51) Int. Cl.
*H01M 10/42* (2006.01)
*H04B 1/7143* (2011.01)
*H04B 1/715* (2011.01)

(52) U.S. Cl.
CPC ...... *H01M 10/4207* (2013.01); *H04B 1/7143* (2013.01); *H04B 1/715* (2013.01);
(Continued)

(58) Field of Classification Search
CPC .. H01M 10/42; H01M 10/60; H01M 10/4207; H04B 1/713; H04B 1/7143; H04B 1/715; H04B 1/7154
See application file for complete search history.

(56) References Cited

U.S. PATENT DOCUMENTS

| | | | |
|---|---|---|---|
| 7,283,580 B2 * | 10/2007 | Cumeralto | H04B 3/546 340/870.03 |
| 8,427,971 B2 * | 4/2013 | Fischer | H04W 74/002 370/252 |

(Continued)

FOREIGN PATENT DOCUMENTS

| | | |
|---|---|---|
| EP | 3890096 A1 | 10/2021 |
| JP | 2008-125110 A | 5/2008 |

(Continued)

OTHER PUBLICATIONS

International Search Report (with translation) and Written Opinion dated Nov. 22, 2021, issued in corresponding International Application No. PCT/KR2021/010597.

(Continued)

*Primary Examiner* — James M Perez
(74) *Attorney, Agent, or Firm* — Morgan, Lewis & Bockius LLP

(57) ABSTRACT

The present invention relates to a wireless communication method in a battery pack and a master BMS for providing the method. The master BMS according to the present invention, as a master BMS for performing wireless communication with a slave BMS according to a frequency hopping method in a battery pack, may include: a communicator for receiving first channel scan information generated by scanning a plurality of channels belonging to a frequency bandwidth used in the wireless communication by a device disposed outside the battery pack; a channel analyzer for generating second channel scan information by (Continued)

scanning the channels belonging to the frequency bandwidth; a storage unit for storing a reference signal to noise ratio (SNR) value on the wireless communication; and a control unit for selecting a hopping channel used in the frequency hopping method based on the first channel scan information, and calculating signal intensity of the selected hopping channel based on the second channel scan information and the reference SNR value.

12 Claims, 3 Drawing Sheets

(52) U.S. Cl.
CPC .............. *H01M 2010/4271* (2013.01); *H01M 2010/4278* (2013.01)

(56) References Cited

U.S. PATENT DOCUMENTS

| | | | | |
|---|---|---|---|---|
| 8,952,889 | B2* | 2/2015 | Jacobsen | H04W 88/06 375/133 |
| 9,590,693 | B2* | 3/2017 | Ahn | H04L 27/2621 |
| 10,084,508 | B2* | 9/2018 | Ahn | H04L 5/0007 |
| 10,117,205 | B2* | 10/2018 | Kim | H04W 56/002 |
| 10,182,335 | B2* | 1/2019 | Kim | H04L 5/005 |
| 10,624,086 | B2* | 4/2020 | Gordon | H04Q 9/00 |
| 10,715,211 | B2* | 7/2020 | Petkov | H04B 17/318 |
| 10,721,777 | B2* | 7/2020 | Shin | H04L 5/1469 |
| 10,790,872 | B1* | 9/2020 | Blanchard | H04L 27/2634 |
| 10,972,147 | B2* | 4/2021 | Petkov | H04L 1/20 |
| 11,050,458 | B2* | 6/2021 | Blanchard | H04L 1/0061 |
| 11,082,083 | B2* | 8/2021 | Blanchard | H04L 1/0054 |
| 11,082,084 | B2* | 8/2021 | Blanchard | H04W 52/241 |
| 11,228,338 | B2* | 1/2022 | Blanchard | H04B 7/0632 |
| 11,412,552 | B2* | 8/2022 | Shin | H04W 74/085 |
| 11,515,578 | B2* | 11/2022 | Lee | G01R 31/3647 |
| 11,552,673 | B2* | 1/2023 | Blanchard | H04W 52/241 |
| 2002/0109607 | A1* | 8/2002 | Cumeralto | H04B 3/36 340/870.02 |
| 2006/0019694 | A1 | 1/2006 | Sutivong et al. | |
| 2006/0133543 | A1 | 6/2006 | Linksy et al. | |
| 2009/0111463 | A1* | 4/2009 | Simms | H04W 16/14 455/424 |
| 2011/0106280 | A1* | 5/2011 | Zeier | H01M 10/425 700/90 |
| 2012/0068921 | A1* | 3/2012 | Jacobsen | H04W 88/06 375/E1.034 |
| 2013/0175976 | A1* | 7/2013 | Rana | H02J 7/00306 320/107 |
| 2013/0251001 | A1 | 9/2013 | Lee et al. | |
| 2013/0271072 | A1* | 10/2013 | Lee | H01M 10/4207 320/108 |
| 2014/0347014 | A1* | 11/2014 | Lee | H02J 7/0047 320/134 |
| 2015/0028816 | A1* | 1/2015 | Lee | H02J 13/00002 320/134 |
| 2016/0056510 | A1* | 2/2016 | Takeuchi | H01M 10/425 429/50 |
| 2017/0034799 | A1* | 2/2017 | Kim | H04W 56/003 |
| 2017/0078863 | A1* | 3/2017 | Kim | H04L 5/005 |
| 2017/0134068 | A1* | 5/2017 | Ahn | H04L 5/0007 |
| 2019/0385057 | A1* | 12/2019 | Litichever | H04L 63/14 |
| 2020/0083730 | A1* | 3/2020 | Dan | G01R 31/392 |
| 2020/0084090 | A1 | 3/2020 | Dan et al. | |
| 2020/0200828 | A1* | 6/2020 | Sung | H04B 17/318 |
| 2020/0220746 | A1* | 7/2020 | Shribman | H04W 48/18 |
| 2020/0313717 | A1* | 10/2020 | Blanchard | H04B 1/7115 |
| 2020/0313718 | A1* | 10/2020 | Blanchard | H04B 7/0617 |
| 2020/0313719 | A1* | 10/2020 | Blanchard | H04B 17/336 |
| 2020/0395977 | A1* | 12/2020 | Blanchard | H04B 1/692 |
| 2021/0021298 | A1* | 1/2021 | Blanchard | H04W 52/42 |
| 2021/0184273 | A1* | 6/2021 | Lee | B60L 58/16 |
| 2022/0021413 | A1* | 1/2022 | Blanchard | H04W 4/10 |
| 2022/0029204 | A1* | 1/2022 | Yang | H01M 50/224 |
| 2022/0074998 | A1* | 3/2022 | Aquilano | G01R 31/382 |
| 2022/0086824 | A1* | 3/2022 | Kundu | H04L 5/0053 |
| 2022/0103525 | A1* | 3/2022 | Shribman | G06F 16/955 |
| 2022/0260641 | A1* | 8/2022 | Yoon | H01M 10/482 |
| 2022/0291287 | A1* | 9/2022 | Yoon | G01R 31/382 |
| 2023/0207890 | A1* | 6/2023 | Yoon | H04B 1/715 375/132 |
| 2023/0280409 | A1* | 9/2023 | Yoon | G01R 31/3842 324/430 |
| 2023/0388980 | A1* | 11/2023 | Xhafa | H02J 7/00032 |

FOREIGN PATENT DOCUMENTS

| | | |
|---|---|---|
| JP | 2010-171980 A | 8/2010 |
| JP | 2013-541320 A | 11/2013 |
| JP | 6228552 B2 | 11/2017 |
| JP | 2020-526161 A | 8/2020 |
| KR | 10-0246204 B1 | 3/2000 |
| KR | 10-0949796 B1 | 3/2010 |
| KR | 10-1027965 B1 | 4/2011 |
| KR | 10-1228890 B1 | 2/2013 |
| KR | 10-2014-0015273 A | 2/2014 |
| KR | 10-2014-0060801 A | 5/2014 |
| KR | 10-2018-0061712 A | 6/2018 |
| KR | 10-2019-0071683 A | 6/2019 |
| KR | 10-2019-0084681 A | 7/2019 |
| KR | 10-2019-0101286 A | 8/2019 |
| WO | 2020/159300 A1 | 8/2020 |

OTHER PUBLICATIONS

Extended European Search Report issued on Oct. 30, 2023, in corresponding European Application No. 21869545.0.

Office Action issued on Nov. 7, 2023, in corresponding Japanese Patent Application No. 2022-564757.

* cited by examiner

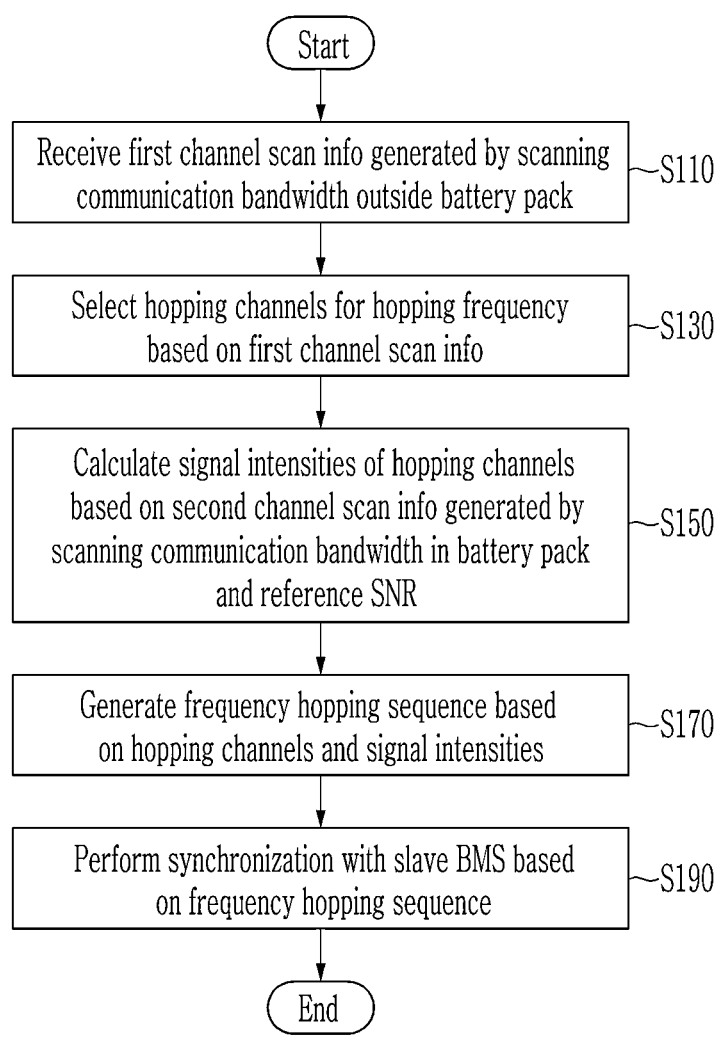

WIRELESS COMMUNICATION METHOD IN BATTERY PACK AND MASTER BMS PROVIDING THE METHOD

CROSS-REFERENCE TO RELATED APPLICATION

This application claims priority to and the benefit of Korean Patent Application No. 10-2020-0121337 filed in the Korean Intellectual Property Office on Sep. 21, 2020, the entire contents of which are incorporated herein by reference.

TECHNICAL FIELD

The present invention relates to a wireless communication method in a battery pack. More particularly, the present invention relates to a wireless communication method between a master BMS and a slave BMS, and a master BMS for providing the method.

DESCRIPTION OF THE RELATED ART

Battery packs, and particularly, medium to large battery packs used in vehicles or ESS, may include a plurality of battery modules. The battery modules has a multi-module structure in which the same are coupled in series and/or in parallel, thereby increasing capacities and/or outputs of the battery packs.

The multi-structured battery packs may be realized in various forms according to circuit logics or PCB configurations. In this case, the battery management system (BMS) generally uses a multi-slave structure so as to improve monitoring and control efficiency. The multi-slave structure is configured for a plurality of slave BMSs to cover a plurality of battery modules configuring a battery pack and for a master BMS to integrally control a plurality of slave BMSs.

A wired communication method has been used between one master BMS and slave BMSs in the conventional battery pack, but there have been many problems such as complicated communication links. Hence, many attempts to use wireless communication methods between one master BMS and slave BMSs in the battery pack have been made.

However, the wireless communication methods also have drawbacks, and the most typical one thereof is battery power consumption. Accuracy of communication is important as data on battery information are transmitted and received in the battery pack. The master BMS assumes the worst case to set a maximum signal transmission power at the time of transmitting data and performs wireless communication with a plurality of slave BMSs with predetermined signal transmission power. Excessive power consumption may be continuously generated.

That is, the slave BMS is electrically connected to the battery module, and it may receive power from the battery module and may perform wireless communication. The data are transmitted and received with a maximum signal transmission power in consideration of the worst case without reflecting actual external noise, so power of the battery module may be steeply reduced.

Hence, a communication method for transmitting/receiving data with optimal signal transmission power to reduce power consumption of the battery module and for reducing an interference phenomenon by external noise is needed when the wireless communication between one master BMS and a plurality of slave BMSs is performed in the battery pack.

DETAILED DESCRIPTION

Technical Objects

The present invention has been made in an effort to provide a wireless communication method in a battery pack for selecting a plurality of hopping channels used to a frequency hopping method based on noise intensities and noise types for respective channels measured outside the battery pack, and a master BMS for providing the method.

The present invention has been made in another effort to provide a wireless communication method in a battery pack for calculating signal transmission power (TP) for respective hopping channels based on noise intensities for channels measured in the battery pack, and a master BMS for providing the method.

The present invention has been made in another effort to provide a wireless communication method in a battery pack for generating a hopping sequence based on a plurality of hopping channels and signal transmission power calculated for the respective hopping channels and performing wireless communication between a master BMS and slave BMSs according to the hopping sequence, and a master BMS for providing the method.

Solutions

An embodiment of the present invention provides a master battery management system (BMS) as a master BMS for performing wireless communication with a slave BMS according to a frequency hopping method in a battery pack including: a communicator for receiving first channel scan information generated by scanning a plurality of channels belonging to a frequency bandwidth used in the wireless communication by a device disposed outside the battery pack; a channel analyzer for generating second channel scan information by scanning channels belonging to the frequency bandwidth; a storage unit for storing a reference signal to noise ratio (SNR) value on the wireless communication; and a control unit for selecting a hopping channel used to the frequency hopping method based on the first channel scan information, and calculating signal intensity of the selected hopping channel based on the second channel scan information and the reference SNR value.

The first channel scan information may include first noise intensities of the respective channels, and the control unit may compare the first noise intensity and a reference value and may select a channel having the first noise intensity that is less than the first reference value from among the channels as the hopping channel.

The first channel scan information may include a first noise type and first noise intensity of the respective channels, and the control unit may compare the first noise intensity and a reference value and may select a channel that has the first noise intensity that is less than the first reference value from among the channels and that does not include noise predetermined to the first noise type as the hopping channel.

The second channel scan information may include second noise intensities of the respective channels, and the control unit may calculate signal intensity satisfying the reference SNR value on the second noise intensity and may set the calculated signal intensity as signal intensity of the hopping channel.

The control unit may generate a hopping sequence of the frequency hopping method based on the hopping channel and signal intensity of the hopping channel, and may perform synchronization with the slave BMS based on the hopping sequence so that the same is disposed in a same hopping channel at the same time with the slave BMS.

The frequency bandwidth may include a frequency bandwidth to which an industrial scientific medical (ISM) band belongs.

Another embodiment of the present invention provides a wireless communication method in a battery pack as a method for a master battery management system (BMS) to perform a wireless communication with a slave BMS according to a frequency hopping method in a battery pack including: receiving first channel scan information generated by scanning a plurality of channels belonging to a frequency bandwidth used in the wireless communication by a device outside the battery pack; selecting a hopping channel used in the frequency hopping method based on the first channel scan information; calculating signal intensity of the hopping channel based on second channel scan information generated by scanning the channels belonging to the frequency bandwidth in the battery pack and a reference signal to noise ratio (SNR) value on the wireless communication; and generating a hopping sequence of the frequency hopping method based on signal intensity of the hopping channel and the hopping channel.

The selecting of a hopping channel may include: comparing first noise intensities of the channels included in the first channel scan information and a reference value, and selecting a channel having the first noise intensity that is less than the first reference value from among the channels as the hopping channel.

The selecting of a hopping channel may include: comparing first noise intensities of the respective channels included in the first channel scan information and a reference value, and selecting a channel having the first noise intensity that is less than the first reference value from among the channels not including noise predetermined as a first noise type included in the first channel scan information as the hopping channel.

The calculating of signal intensity of the hopping channel may include: calculating signal intensity satisfying the reference SNR value in a second noise intensity of the hopping channel included in the second channel scan information, and setting the calculated signal intensity to be a signal intensity of the hopping channel.

The wireless communication method may further include, after the generating of a hopping sequence of the frequency hopping method, performing synchronization with the slave BMS based on the hopping sequence so as to be positioned in a same hopping channel at a same time as the slave BMS.

Effects

The present invention may avoid interference trouble with other communication protocols such as the Bluetooth or Wi-Fi using the industrial scientific medical (ISM) band in common by selecting the hopping channel for wireless communication between a master BMS and slave BMSs based on noise intensity and/or noise types measured outside the battery pack.

The present invention may reduce unnecessary power consumption for wireless communication between a master BMS and slave BMSs by calculating optimal signal transmission power for respective hopping channels based on the noise intensity measured in the battery pack.

BRIEF DESCRIPTION OF THE DRAWINGS

FIG. 3 shows a flowchart of a wireless communication method in a battery pack according to an embodiment.

DETAILED DESCRIPTION OF THE EMBODIMENTS

Figure 1:
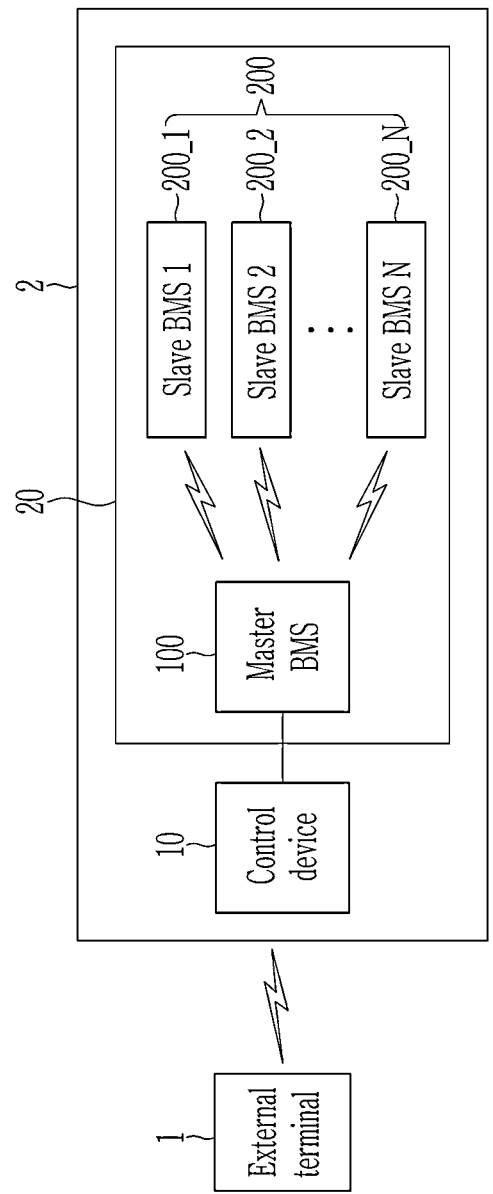
FIG. 1 shows a system for providing a wireless communication method in a battery pack according to an embodiment.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components and are not to be interpreted as limiting these components. The terms are only used to differentiate one component from others.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected or coupled to another component without the other component intervening therebetween.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

FIG. 1 shows a system for providing a wireless communication method in a battery pack according to an embodiment.

Referring to FIG. 1, the system for providing a wireless communication method in a battery pack includes an external terminal 1 and a vehicle system 2.

The external terminal 1 may be a portable terminal possessed by a driver who gets on the vehicle. For example, when the driver gets in the vehicle and turns on the vehicle system 2, the external terminal 1 and the vehicle system 2 may perform a wireless communication with a predetermined communication module. The communication module may be a communication module such as Bluetooth, Wi-Fi, or Zigbee.

The external terminal 1 may scan a plurality of channels in a frequency bandwidth and may measure noise types and noise intensities of the channels to generate first channel scan information. For example, when the vehicle system 2 is turned on, the external terminal 1 may include an application for generating the first channel scan information and transmitting the same to the vehicle system 2 for respective predetermined periods or in real-time.

Depending on embodiments, the frequency bandwidth may include an industrial scientific medical (ISM) bandwidth. The ISM bandwidth is a frequency bandwidth that is allocated to the fields of the industry, science, and medical treatments, and is usable without additional allowance of usage. A common ISM bandwidth is globally established to the bandwidths of 900 MHZ, 2.4 GHZ, and 5.7 GHZ. For example, the Bluetooth and the Zigbee use one kind of the frequency bandwidth (2.4 GHZ), and the Wi-Fi uses two kinds of the frequency bandwidths (2.4 GHZ and 5 GHZ).

The ISM bandwidth is used by various wireless communication devices, so it has a trouble of deterioration of performance caused by communication interference. To prevent the communication interference, the communication protocol such as the Bluetooth, the Wi-Fi, or the Zigbee using the ISM bandwidth performs the communication according to a frequency hopping method. The frequency hopping method represents a communication method for dividing a frequency bandwidth in use into a plurality of channels with a predetermined bandwidth, quickly moving among the channels according to a specific pattern (hereinafter, a hopping sequence), dividing data, and transmitting the same.

The vehicle system 2 includes a control device 10 and a battery pack 20.

The control device 10 generally controls the vehicle system 2, and for example, it may be an electronic control unit (ECU) but is not limited thereto.

According to an embodiment, the control device 10 may include a first communication device for performing wireless communication with the external terminal 1, and a second communication device for performing vehicle communication with the battery pack 20. The first communication device may include a wireless communication module such as the Bluetooth, Wi-Fi, or Zigbee. The second communication device may include a vehicle communication module such as a controller area network (CAN), a local interconnect network (LIN), or a FlexRay used to communication in the vehicle.

The control device 10 may receive first channel scan information from the external terminal 1 through the first communication module and may transmit the first channel scan information to the battery pack 20 through the second communication module.

The battery pack 20 includes a master battery management system (BMS) 100 and a slave BMS 200.

The battery pack includes a plurality of battery modules (not shown) in addition to the master BMS 100 and the slave BMS 200. The respective battery modules include a plurality of battery cells electrically connected in series. For example, the battery pack may be mounted on the vehicle to supply power and drive a motor or may supply power so that various electronic devices, such as audio units or air conditioners, may be operated. Here, the vehicle may be an electric vehicle (EV), and a hybrid vehicle (HEV or PHEV) receiving driving power from the battery pack.

The battery pack 20 communicates with various external electronic devices according to the vehicle communication method such as the CAN, the LIN, or the FlexRay, and depending on embodiments, electronic devices in the battery pack 20 may perform communication according to the wireless communication method following the frequency hopping method. According to an embodiment, the master BMS 100 is installed in the battery pack 20, it may communicate with the external control device 10 according to a vehicle communication method such as the CAN communication, and it may communicate with the internal slave BMS 200 according to a wireless communication method such as the frequency hopping method. The slave BMS 200 is installed in the battery pack 20, it may not directly communicate with the outside, and it may communicate with the master BMS 100 according to the wireless communication method following the frequency hopping method.

Performance of the wireless communication is not determined by absolute signal intensity but may be determined by a ratio value of signal intensity to noise intensity, that is, relative signal intensity. Mean power (signal transmission power) of signals is changed by an amplifier or an attenuator, and noise is added thereto to degrade a transmission characteristic, so it is difficult to use the mean power as an index of performance of the wireless communication. That is, the performance of the wireless communication may be determined by a signal-to-noise ratio (SNR).

The SNR is a measure for quantitatively indicating an influencing force of noise to the signal carrying information, showing a degree of how high a power level a signal level has compared to a noise level. That is, signals generally coexist with noise. The influence of noise to the signal may be quantitatively found by the SNR.

$$SNR = 10\log\frac{P_S}{P_N} \quad \text{(Equation 1)}$$

Equation 1 calculates the SNR. $P_S$ is a mean signal transmission power, $P_N$ is a mean noise power, and a unit of the SNR may be decibels (dB). Referring to Equation 1, the SNR signifies that the influence of noise is less as the value becomes bigger.

For example, an excellent SNR level of audio may be equal to or greater than 40 dB (preferably 60 dB), and an excellent SNR level of video may be equal to or greater than 45 dB (preferably 55 dB). According to an embodiment, in the case of the data mutually transmitted and received between the master BMS 100 and the slave BMS 200, the excellent SNR level may be set by an upper control device such as the control device 10.

The master BMS 100 may integrally control a plurality of slave BMSs 200_1, 200_2, . . . , 200_N. For example, the master BMS 100 may perform wireless communication with the slave BMSs 200 to receive battery information and transmit instructions. The battery information may include information (e.g., a cell current, a cell voltage, a cell temperature, etc.,) measured by the slave BMS 200 and information (e.g., an SOC (State of Charge) and an SOH (State of Health)) estimated by the slave BMS 200.

According to an embodiment, the master BMS 100 may generate a frequency hopping sequence and may perform wireless communication with the slave BMS 200 according to the frequency hopping sequence. For example, the master BMS 100 may select a plurality of hopping channels to be used in the frequency hopping method from among a plurality of channels CH_1 to CH_N existing in the ISM bandwidth as frequency bandwidth used in the wireless communication, and may calculate signal intensities of the respective hopping channels to generate a frequency hopping sequence.

The frequency hopping method is a communication method for preventing deterioration of communication quality caused by signal interference with another communication device using the same frequency bandwidth, that is, the ISM bandwidth. That is, the frequency hopping method is a communication method for dividing the frequency bandwidth into frequencies with predetermined sizes to have a plurality of channels with different frequencies, and for dividing data and transmitting the divided data while changing the channels.

For example, when the ISM bandwidth is divided into ten channels of the first channel CH_1 to the tenth channel CH_10, the master BMS 100 changes the channels to the first channel CH_1, the third channel CH_3, the eighth channel CH_8, etc., according to a predetermined pattern, divides the data, and transmits the divided data, thereby reducing or solving the mutual interference of the signal. The predetermined pattern may be a hopping sequence.

The master BMS 100 may select the channel having noise intensity that is equal to or less than a reference value as a hopping channel from among a plurality of channels belonging to the frequency bandwidth. For example, from among the ten divided channels of the first channel CH_1 to the tenth channel CH_10 in the ISM bandwidth, the master BMS 100 may discard the channel with high power density by noise and may select the channel with power density by noise that is equal to or less than a reference value as hopping channel. The noise in this instance includes all the signals excluding the data transmitted and received between the master BMS 100 and the slave BMS 200, and for example, it may include signals transmitted through the channel by the Bluetooth, the Wi-Fi, or the Zigbee.

When a case of the battery pack 20 is made of a metal, some of the noise existing outside the battery pack 20 is blocked and is not transmitted into the battery pack 20. That is, the inside of the battery pack 20 is influenced by the external noise, and it is difficult to clearly distinguish external noise types and noise intensities in the battery pack 20. According to an embodiment, the master BMS 100 may select the hopping channel based on the first channel scan information generated by scanning the frequency bandwidth outside the battery pack 20. Detailed descriptions will be provided below with reference to FIG. 2 and FIG. 3.

The master BMS 100 may calculate the signal intensity when the hopping channel transmits and receives data, based on the noise intensity of the channel selected as the hopping channel and the predetermined SNR. The signal intensity may be power of the signal averaged with respect to time and may be determined by a data transmitting device. For example, when predetermined signal intensity is big, the slave BMS 200 must receive much power from the battery module so as to transmit data to the master BMS 100.

According to an embodiment, the master BMS 100 may put the noise intensity and the SNR into Equation 1 to calculate the signal intensity. The noise intensity may be noise power, and the signal intensity may be signal transmission power. For example, when the hopping channels respectively have different noise power, the master BMS 100 may calculate the signal transmission power for the respective hopping channels.

The hopping channels are used in the wireless communication in the battery pack 20, so according to an embodiment, the master BMS 100 may scan the frequency bandwidth in the battery pack 20 to generate second channel scan information and may calculate the signal transmission power based on the noise power of the hopping channel included in the second channel scan information. That is, the master BMS 100 may optimally calculate the signal transmission power based on the noise power measured in an environment in which the wireless communication is performed. Unnecessary power consumption may then be reduced. Detailed descriptions will be provided below with reference to FIG. 2 and FIG. 3.

The slave BMS 200 is a system electrically connected to a battery module (not shown) and measuring a state of the battery module and managing the state thereof. For example, the slave BMS 200 may predict the state of charge (SOC) of the battery cell and may perform battery cell balancing. According to an embodiment, the slave BMS 200 may perform wireless communication with the master BMS 100 according to the frequency hopping sequence.

The slave BMS 200 receives power for transmitting data from the battery module. For example, when big signal transmission power is set, power for performing the wireless communication (for example, the slave BMS 200 transmits battery information to the master BMS 100) also becomes bigger. The battery module may then be quickly discharged.

Figure 2:
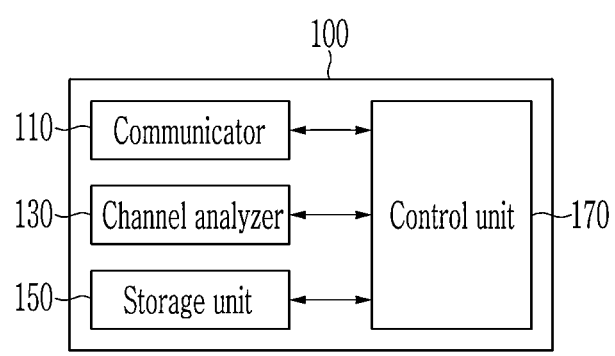
FIG. 2 shows a configuration of a master BMS shown in FIG. 1.

FIG. 2 shows a configuration of a master BMS shown in FIG. 1.

Referring to FIG. 2, the master BMS 100 includes a communicator 110, a channel analyzer 130, a storage unit 150, and a control unit 170.

The communicator 110 may include a first communication module communicating with the control device 10, and a second communication module communicating with the slave BMS 200.

The first communication module may communicate with the control device 10 by control of the control unit 170 to receive the first channel scan information and may store the first channel scan information in the storage unit 150. For example, the first communication module may include a vehicle communication module such as a controller area network (CAN), a local interconnect network (LIN), or a FlexRay used to the communication in the vehicle.

The first channel scan information may be generated by an external terminal 1 positioned outside the battery pack 20. For example, the first channel scan information may include a first noise type and first noise power of the respective ten channels of the first channel CH_1 to the tenth channel CH_10 included in the ISM bandwidth.

The second communication module may perform wireless communication with the slave BMS 200 according to the frequency hopping sequence by control of the control unit 170. The frequency hopping sequence may be generated by the control unit 170 and may be stored in the storage unit 150.

The channel analyzer 130 may scan a plurality of channels of a frequency bandwidth and may measure a second noise type and second noise power of the channels to generate second channel scan information. For example, when the vehicle system 2 is turned on, the channel analyzer 130 may generate second channel scan information and transmit the same to the control unit 170 for predetermined periods or in real-time. The frequency bandwidth may be the ISM bandwidth.

The second channel scan information may be generated by the channel analyzer 130 positioned inside the battery pack 20. For example, the second channel scan information may include a second noise type and second noise power of the respective ten channels of the first channel CH_1 to the tenth channel CH_10 included in the ISM bandwidth. According to an embodiment, first channel scan information and second channel scan information are respectively generated outside and inside the battery pack 20, so the first noise power and the second noise power of the respective first channel CH_1 to the tenth channel CH_10 may be different from each other.

The signal according to an embodiment may include the data transmitted and received between the master BMS 100 and the slave BMS 200, and the noise may include the signals transmitted and received by other devices that are not the master BMS 100 and the slave BMS 200. Therefore, measured signals for respective channels included in the first channel scan information and the second channel scan information may be noise.

The storage unit 150 may store a reference SNR value that becomes the reference to determine the performance of wireless communication performed in the battery pack 20. The storage unit 150 may store the first channel scan information received from the control device 10 through the first communication module and the second channel scan information generated by the channel analyzer 130.

According to an embodiment, the control device 10 may predetermine a minimum SNR on the data transmitted and received between the master BMS 100 and the slave BMS 200, that is, the reference SNR value (e.g., 5 dB). For example, the control unit 170 may transmit the data to the slave BMS 200 with signal transmission power that allows the reference SNR value to be at least 5 dB.

The control unit 170 selects a plurality of hopping channels based on the first channel scan information and calculates signal intensities of the respective hopping channels based on the second channel scan information and the reference SNR value to generate a frequency hopping sequence.

The control unit 170 may select a plurality of hopping channels to be used in the frequency hopping method from among a plurality of channels CH_1 to CH_N existing in the ISM bandwidth based on the first noise type and the first noise power measured outside the battery pack 20.

For example, the channels that have the first noise power that is equal to or less than a reference value from among the first channel CH_1 to the tenth channel CH_10 existing in the ISM bandwidth may be the first channel CH_1, the third channel CH_3, and the eighth channel CH_8 based on the first channel scan information. The control unit 170 may select the first channel CH_1, the third channel CH_3, and the eighth channel CH_8 as hopping channels.

For another example, the control unit 170 may select the channels that have the first noise power that is equal to or less than a reference value and do not include a specific noise type from among the first channel CH_1 to the tenth channel CH_10 existing in the ISM bandwidth as hopping channels. That is, when the channel that has low power density by the first noise is used by noise (the Bluetooth, the Wi-Fi, the Zigbee, etc.), the control unit 170 may not select the corresponding channel as a hopping channel.

The control unit 170 may calculate signal transmission power of the respective hopping channels based on the second noise power measured in the battery pack 20 and the reference SNR value.

When the signal transmission power of the actually transmitted data is high, that is, when the SNR value that is a signal transmission power to noise power ratio increases, a receiving side may clearly understand the signal. However, the case in which the data are transmitted with more than appropriate signal transmission power provides wireless communication performance that is not much different from the case in which the data are transmitted with the optimal signal transmission power, but the slave BMS 200 has a drawback of using much power of the battery module to transmit the data. According to an embodiment, the control unit 170 may calculate the signal transmission power of the data transmitted and received in the battery pack 20 based not on the first noise power measured outside the battery pack 20, but on the second noise power measured inside the battery pack 20.

For example, the control unit 170 may extract second noise power of the hopping channel included in the second channel scan information and may calculate the signal transmission power of the hopping channel by substituting the extracted second noise power into Equation 1. When the first channel CH_1, the third channel CH_3, and the eighth channel CH_8 are selected as hopping channels, the second noise power of the respective first channel CH_1, the third channel CH_3, and the eighth channel CH_8 may be extracted from the second channel scan information, and the extracted second noise power may be substituted into Equation 1 to calculate the signal transmission power of the first channel CH_1, the third channel CH_3, and the eighth channel CH_8.

The control unit 170 may generate a frequency hopping sequence based on the selected hopping channels and the signal transmission power of the respective hopping channels. For example, the control unit 170 may configure the first channel CH_1, the third channel CH_3, the first channel CH_1, the eighth channel CH_8, and the third channel CH_3 as one set. The frequency hopping sequence may be configured in order of repeating the channel set.

FIG. 3 shows a flowchart of a wireless communication method in a battery pack according to an embodiment.

A wireless communication method in a battery pack and a master BMS providing the method will now be described with reference to FIG. 1 to FIG. 3.

The master BMS 100 may receive the first channel scan information generated by the external terminal 1 positioned outside the battery pack 20 through the control device 10 (S110).

The external terminal 1 may scan a plurality of channels belonging to the frequency bandwidth used to the wireless communication in the battery pack 20 to generate first channel scan information and may transmit the first channel scan information to the control device 10. The control device 10 may transmit the first channel scan information to the master BMS 100.

The external terminal 1 may be a portable terminal possessed by the driver getting in the vehicle. For example, when the driver gets in the vehicle to turn on the vehicle system 2, the external terminal 1 and the vehicle system 2 may perform wireless communication with a predetermined communication module. The communication module may be a communication module such as the Bluetooth, the Wi-Fi, or the Zigbee.

The external terminal 1 may scan a plurality of channels of the frequency bandwidth and may measure a first noise type and first noise intensity of the respective channels to generate first channel scan information. The frequency bandwidth may include the industrial scientific medical (ISM) bandwidth. The ISM bandwidth is a frequency bandwidth that is allocated to the fields of the industry, science, and medical treatments, and is usable without additional allowance of usage.

For example, the first channel scan information may include a first noise type and first noise power of the respective ten channels of the first channel CH_1 to the tenth channel CH_10 included in the ISM bandwidth.

The master BMS 100 may select the hopping channel used to the frequency hopping method based on the first channel scan information (S130).

According to an embodiment, the master BMS 100 may compare a reference value and first noise intensities of the respective channels included in the first channel scan information, and may select the channel having first noise intensity that is less than the first reference value from among a plurality of channels as a hopping channel.

For example, the channels having first noise power that are equal to or less than a reference value from among the first channel CH_1 to the tenth channel CH_10 existing in the ISM bandwidth may be the first channel CH_1, the third channel CH_3, and the eighth channel CH_8 based on the first channel scan information. The master BMS 100 may select the first channel CH_1, the third channel CH_3, and the eighth channel CH_8 as hopping channels.

According to another embodiment, the master BMS 100 may compare a reference value and first noise intensities of the respective channels included in the first channel scan information, and may select the channels that have first noise intensity that is less than a first reference value from among the channels, and that do not include predetermined noise in the first noise type included in the first channel scan information as hopping channels.

For example, when based on the first channel scan information, the channels that have first noise power that is equal to or less than a reference value from among the first channel CH_1 to the tenth channel CH_10 existing in the ISM bandwidth may be the first channel CH_1, the third channel CH_3, and the eighth channel CH_8. The type of the predetermined noise is a Bluetooth protocol, and the Bluetooth protocol may use the third channel CH_3 based on the first channel scan information. The master BMS 100 may select the first channel CH_1 and the eighth channel CH_8 as hopping channels.

The master BMS 100 may calculate signal intensity of the hopping channel based on the second channel scan information and the reference SNR value on the wireless communication (S150).

The master BMS 100 may scan a plurality of channels belonging to the frequency bandwidth in the battery pack 20 to generate second channel scan information. The second channel scan information may include second noise intensity of the channels.

The master BMS 100 may calculate the signal intensity satisfying the reference SNR value for the second noise intensity of the hopping channel included in the second channel scan information. The master BMS 100 may determine the calculated signal intensity to be signal intensity of the hopping channel.

For example, the master BMS 100 may substitute the second noise intensity of the first channel CH_1 selected as a hopping channel and the reference SNR value into Equation 1, and may calculate signal intensity of the first channel CH_1. The master BMS 100 may substitute the second noise intensity of the third channel CH_3 selected as a hopping channel and the reference SNR value into Equation 1, and may calculate signal intensity of the third channel CH_3. The master BMS 100 may substitute the second noise intensity of the eighth channel CH_8 selected as a hopping channel and the reference SNR value into Equation 1, and may calculate the signal intensity of the eighth channel CH_8.

The master BMS 100 may generate a hopping sequence of the frequency hopping method based on the hopping channel and the signal intensity of the hopping channel (S170).

The master BMS 100 may set an order so that the first channel CH_1, the third channel CH_3, and the eighth channel CH_8 that are hopping channels may have an arbitrary pattern. For example, the master BMS 100 may configure the first channel CH_1, the third channel CH_3, the first channel CH_1, the eighth channel CH_8, and the third channel CH_3 as a channel set. The master BMS 100 may generate a hopping sequence in order of repeating the channel set. That is, hopping sequence may be repeated in like order of the first channel CH_1, the third channel CH_3, the first channel CH_1, the eighth channel CH_8, the third channel CH_3, the first channel CH_1, the third channel CH_3, the first channel CH_1, the eighth channel CH_8, the third channel CH_3, the first channel CH_1, the third channel CH_3, the first channel CH_1, the eighth channel CH_8, and the third channel CH_3, and may be set to transmit and receive the data according to the signal transmission power for the respective channels.

The master BMS 100 may perform synchronization with the slave BMS 200 based on the hopping sequence so that it may be positioned in the same hopping channel at the same time with the slave BMS 200 (S190).

To receive the data from the slave BMS 200, the master BMS 100 must be tuned with a specific frequency at a specific time by using the same hopping sequence as the hopping sequence used when the slave BMS 200 transmits data. That is, the master BMS 100 may resort the data transmitted by the slave BMS 200 when synchronized with the slave BMS 200 based on the hopping sequence.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A master battery management system (BMS) for performing wireless communication with a slave BMS according to a frequency hopping method in a battery pack, the master BMS comprising:
   a communicator configured to receive first channel scan information generated by scanning a plurality of channels belonging to a frequency bandwidth used in the wireless communication by a device disposed outside the battery pack;
   a channel analyzer configured to generate second channel scan information by scanning the channels belonging to the frequency bandwidth;
   a storage configured to store a reference signal to noise ratio (SNR) value on the wireless communication; and
   a controller configured to select a hopping channel used in the frequency hopping method based on the first channel scan information and to calculate a signal intensity of the selected hopping channel based on the second channel scan information and the reference SNR value.

2. The master BMS of claim 1, wherein:
the first channel scan information includes a first noise intensity of each of the respective channels, and
the controller is further configured to compare the first noise intensity and a reference value, and to select a channel having the first noise intensity that is less than the reference value from among the channels as the hopping channel.

3. The master BMS of claim 1, wherein:
the first channel scan information includes a first noise type and a first noise intensity of each of the respective channels, and
the controller is further configured to compare the first noise intensity and a reference value, and to select a channel from among the channels that has the first noise intensity less than the reference value, and that does not include noise predetermined as the first noise type as the hopping channel.

4. The master BMS of claim 1, wherein:
the second channel scan information includes a second noise intensity of each of the respective channels, and
the controller is configured to calculate a signal intensity satisfying the reference SNR value on the second noise intensity and to set the calculated signal intensity as the signal intensity of the hopping channel.

5. The master BMS of claim 1, wherein:
the controller is configured to generate a hopping sequence of the frequency hopping method based on the hopping channel and the signal intensity of the hopping channel, and to perform synchronization with the slave BMS based on the hopping sequence so that the master BMS is disposed in a same hopping channel at a same time with the slave BMS.

6. The master BMS of claim 1, wherein:
the frequency bandwidth includes a frequency bandwidth to which an industrial scientific medical (ISM) band belongs.

7. A wireless communication method for a master battery management system (BMS) in a battery pack to perform a wireless communication with a slave BMS according to a frequency hopping method in a battery pack, the method comprising:
receiving first channel scan information generated by scanning a plurality of channels belonging to a frequency bandwidth used in the wireless communication by a device outside the battery pack;
selecting a hopping channel used in the frequency hopping method based on the first channel scan information;
calculating a signal intensity of the hopping channel based on second channel scan information generated by scanning the channels belonging to the frequency bandwidth in the battery pack and a reference signal to noise ratio (SNR) value on the wireless communication; and
generating a hopping sequence of the frequency hopping method based on the signal intensity of the hopping channel and the hopping channel.

8. The wireless communication method of claim 7, wherein the selecting of the hopping channel includes:
comparing a first noise intensity of each of the channels included in the first channel scan information with a reference value, and
selecting a channel having the first noise intensity that is less than the reference value from among the channels as the hopping channel.

9. The wireless communication method of claim 7, wherein:
the first channel scan information includes a first noise type and a first noise intensity of each of the respective channels; and
the selecting of the hopping channel includes:
comparing the first noise intensity of each of the respective channels with a reference value, and
selecting, from among the channels, a channel having the first noise intensity that is less than the reference value and not including noise predetermined as the first noise type as the hopping channel.

10. The wireless communication method of claim 7, wherein the calculating of the signal intensity of the hopping channel includes:
calculating a signal intensity satisfying the reference SNR value in a second noise intensity of the hopping channel included in the second channel scan information, and
setting the calculated signal intensity to be the signal intensity of the hopping channel.

11. The wireless communication method of claim 10, further comprising:
after the generating of the hopping sequence of the frequency hopping method, performing synchronization with the slave BMS based on the hopping sequence for the master BMS to be positioned in a same hopping channel at a same time as the slave BMS.

12. The wireless communication method of claim 7, wherein:
the frequency bandwidth includes a frequency bandwidth to which an industrial scientific medical (ISM) band belongs.

* * * * *